United States Patent
Boriack et al.

(10) Patent No.: US 12,546,389 B2
(45) Date of Patent: Feb. 10, 2026

(54) FEEDER DRIVESHAFT ARRANGEMENT FOR AGRICULTURAL VEHICLE

(71) Applicant: CNH Industrial America LLC, New Holland, PA (US)

(72) Inventors: Cale Boriack, Lititz, PA (US); Nathan E. Isaac, Lancaster, PA (US); Trevor Book, Lititz, PA (US); Lyle Beidler, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 623 days.

(21) Appl. No.: 18/087,241

(22) Filed: Dec. 22, 2022

(65) Prior Publication Data

US 2024/0206397 A1    Jun. 27, 2024

(51) Int. Cl.
| | |
|---|---|
| *F16H 57/035* | (2012.01) |
| *A01D 61/00* | (2006.01) |
| *A01D 67/00* | (2006.01) |
| *F16H 57/021* | (2012.01) |
| *F16H 7/06* | (2006.01) |
| *F16H 55/12* | (2006.01) |
| *F16H 55/30* | (2006.01) |
| *F16H 57/00* | (2012.01) |

(52) U.S. Cl.
CPC ......... *F16H 57/035* (2013.01); *A01D 61/008* (2013.01); *A01D 67/005* (2013.01); *F16H 57/021* (2013.01); *F16H 7/06* (2013.01); *F16H 55/12* (2013.01); *F16H 55/30* (2013.01); *F16H 57/0025* (2013.01)

(58) Field of Classification Search
CPC .. F16H 57/035; F16H 57/021; F16H 57/0025; F16H 55/30; F16H 55/12; F16H 7/06; A01D 67/005; A01D 61/04; A01D 61/008
See application file for complete search history.

(56) References Cited

U.S. PATENT DOCUMENTS

| | | | |
|---|---|---|---|
| 2,270,471 A * | 1/1942 | Pilcher | A01D 61/008 198/672 |
| 2,318,188 A | 5/1943 | Anderson et al. | |
| 2,319,714 A | 5/1943 | Anderson | |

(Continued)

FOREIGN PATENT DOCUMENTS

| | | | |
|---|---|---|---|
| CN | 207653021 U | 7/2018 | |
| CN | 117108709 A * | 11/2023 | ........... F16H 37/065 |

(Continued)

OTHER PUBLICATIONS

Extended European Search Report for EP Application No. 23218746.8 dated May 2, 2024 (seven pages).

*Primary Examiner* — Arpad Fabian-Kovacs

(74) *Attorney, Agent, or Firm* — Buchanan Ingersoll & Rooney PC

(57) ABSTRACT

A feederhouse for an agricultural vehicle includes a frame including opposing side walls, openings disposed in each of the side walls, and an assembled driveshaft including a shaft and a plurality of sprockets that are rotationally fixed to the shaft. The assembled driveshaft is positioned within an interior region of the frame. At least one opening of said openings is sized such that the driveshaft can pass in a transverse direction through the at least one opening.

9 Claims, 3 Drawing Sheets

(56) References Cited

U.S. PATENT DOCUMENTS

| | | | | |
|---|---|---|---|---|
| 2,326,076 A | * | 8/1943 | Solem | B27C 1/12 |
| | | | | 144/250.1 |
| 3,779,251 A | * | 12/1973 | Rowland-Hill | A01F 12/40 |
| | | | | 460/106 |
| 3,785,472 A | * | 1/1974 | Mathews | B65G 17/42 |
| | | | | 198/733 |
| 6,234,127 B1 | * | 5/2001 | Simpson | F16F 15/1232 |
| | | | | 123/90.31 |
| 6,918,238 B2 | | 7/2005 | Cooksey et al. | |
| 6,968,942 B2 | * | 11/2005 | Linder | A01F 12/10 |
| | | | | 474/140 |
| 7,090,070 B2 | | 8/2006 | Linder | |
| 9,706,715 B2 | | 7/2017 | Fuchs et al. | |
| 10,238,035 B2 | | 3/2019 | Walters et al. | |
| 10,390,485 B2 | | 8/2019 | Heyns et al. | |
| 11,441,666 B2 | * | 9/2022 | Boriack | A01D 61/008 |
| 12,144,288 B2 | * | 11/2024 | Beidler | A01F 12/10 |
| 2004/0128967 A1 | * | 7/2004 | Vandewalle | A01D 61/008 |
| | | | | 56/16.4 R |
| 2012/0048687 A1 | * | 3/2012 | Boyd | A01D 75/18 |
| | | | | 198/832 |
| 2014/0305241 A1 | * | 10/2014 | Li | F16H 55/12 |
| | | | | 74/448 |
| 2016/0313688 A1 | * | 10/2016 | Ueno | G03G 21/1647 |
| 2017/0251603 A1 | | 9/2017 | Walters et al. | |
| 2021/0231208 A1 | | 7/2021 | Boriack et al. | |

FOREIGN PATENT DOCUMENTS

| | | | | |
|---|---|---|---|---|
| DE | 69829691 T2 | * | 2/2006 | F16D 3/06 |
| DE | 102014207283 A1 | | 10/2014 | |
| EP | 3219195 A1 | | 9/2017 | |
| EP | 3381268 B1 | * | 3/2021 | B65G 15/12 |
| JP | 2019146517 A | | 9/2019 | |

* cited by examiner

FEEDER DRIVESHAFT ARRANGEMENT FOR AGRICULTURAL VEHICLE

FIELD OF THE INVENTION

The present invention relates to a feederhouse of an agricultural vehicle, such as a combine harvester. More particularly, the present invention relates to the arrangement of a feeder driveshaft and feederhouse.

BACKGROUND OF THE INVENTION

Agricultural equipment, such as combine harvesters that are used to gather agricultural crops, typically have a header that is configured to remove the crop material from the ground, and a feeder housing that conveys the crop material to the main body of the vehicle for processing and temporary storage. The feeder typically is encased in a feeder housing.

A feeder conveyor is contained within a feeder housing (also referred to herein as feederhouse), and includes a forwardly located driveshaft and a rearwardly located shaft encircled by a plurality of endless feeder chains connected together by a plurality of transversely extending slats. The shafts, feeder chain and slats are movable for carrying crop material introduced into feeder housing along a bottom surface of feeder housing for delivery to a threshing mechanism in the well-known conventional manner.

In the process of assembling the feeder, the sprockets are ordinarily set in position on the driveshaft only after assembling driveshaft into the feederhouse. This step of fixing the sprockets on the driveshaft while the driveshaft is already mounted within the feederhouse can be time consuming, resulting in assembly line delays as well as other challenges. In view of the foregoing, it would be desirable to pre-assemble the sprockets on the driveshaft, and then mount the fully-assembled driveshaft within the feederhouse.

SUMMARY OF THE INVENTION

According to one aspect of the invention, a feederhouse for an agricultural vehicle includes a frame including opposing side walls, openings disposed in each of the side walls, and an assembled driveshaft including a shaft and a plurality of sprockets that are rotationally fixed to the shaft. The assembled driveshaft is positioned within an interior region of the frame. At least one opening of said openings is sized such that the driveshaft can pass in a transverse direction through the at least one opening.

According to another aspect, the at least one opening is a scalloped-circle shaped opening.

According to another aspect, a perimeter of the at least one opening follows an undulating or sinusoidal shaped trajectory.

According to another aspect, openings are formed in (i) the frame, (ii) a bearing that is mounted to the frame, and/or (iii) another part that is mounted to the frame.

According to another aspect, a perimeter of the at least one opening corresponds in shape to that of the sprockets.

According to another aspect, each sprocket includes a body and gear teeth extending from the body.

According to another aspect, a bearing includes a bearing opening through which the shaft passes, and wherein the bearing opening constitutes said at least one opening.

According to another aspect, holes surround said at least one opening.

According to another aspect, fasteners are respectively mounted to one of said holes for securing the bearing to said frame.

According to another aspect, the at least one opening is a scalloped-circle shaped opening, and each hole corresponds in position to one scallop of the scalloped-circle shaped opening.

According to another aspect, the shaft has an elongated body that extends along a shaft axis, and the openings each have a central axis that is substantially parallel to said shaft axis.

According to another aspect, the shaft has an elongated body that extends along a shaft axis, and the openings each have a central axis that is substantially parallel to said shaft axis.

According to still another aspect of the invention, a method of assembling a feederhouse for an agricultural vehicle is provided. The method includes the steps of fixing sprockets to a driveshaft to form an assembled driveshaft; and positioning the assembled driveshaft through an opening formed in a sidewall of a frame of the feederhouse.

According to another aspect, the assembled driveshaft extends along an axis, and the positioning step comprises moving the assembled driveshaft along the axis and through the opening formed in the sidewall.

According to another aspect, the method includes the step of mounting a bearing to the driveshaft and the sidewall such that the driveshaft is configured to rotate relative to the frame.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
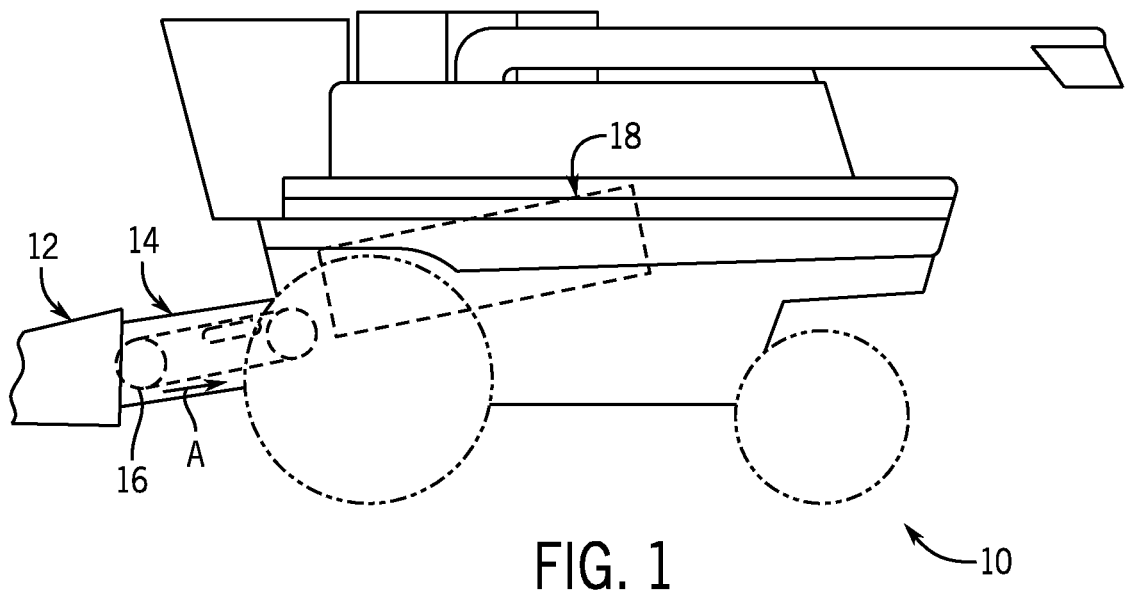
FIG. 1 is a simplified side elevational representation of an agricultural combine including a feeder according to the present invention.

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

Also the terms "forward", "rearward", "left" and "right", for example, when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

FIG. 1 depicts an agricultural combine 10 including a representative header 12 for cutting and harvesting crops, and a feeder 14 connected to the header 12 including a rotatable feeder conveyor 16 for receiving crops from the header 12 and conveying the crops to a rotatable threshing mechanism 18 of combine 10, as generally denoted by arrow A.

Figure 2:
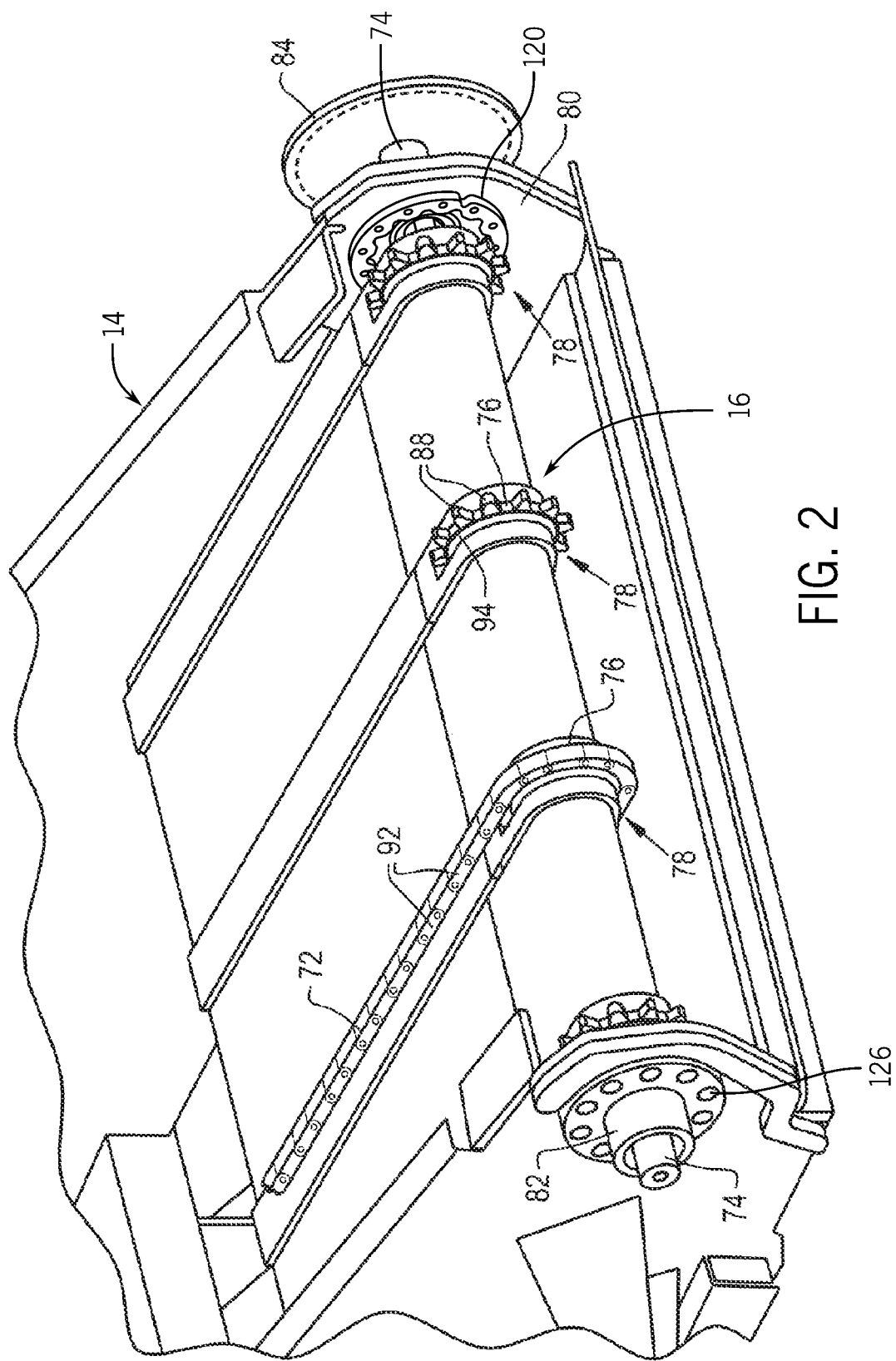
FIG. 2 is an enlarged, simplified perspective view of the feeder of FIG. 1.

FIG. 2 depicts the feeder 14 of combine 10 with various components omitted to reveal internal details of the feeder. The feeder 14 includes the conveyor 16 for rotating a chain 72. Conveyor 16 includes a driveshaft 74, a plurality of sprockets 76 (four shown) fixed to the shaft 74, and a shield assembly 78 covering at least a portion of each sprocket 76. The shaft 74 is rotatably mounted to opposing walls of frame 80 (or housing 80) of the feeder 14 by bearings 82. Shaft 74 is configured to be rotated by connection to a driven gear 84, for example. The shaft 74 can also be rotated by the chain 72 engaging the sprocket 76, with the chain 72 being rotated by a different sprocket or other element. Other means for rotating shaft 74 are known.

Figure 3:
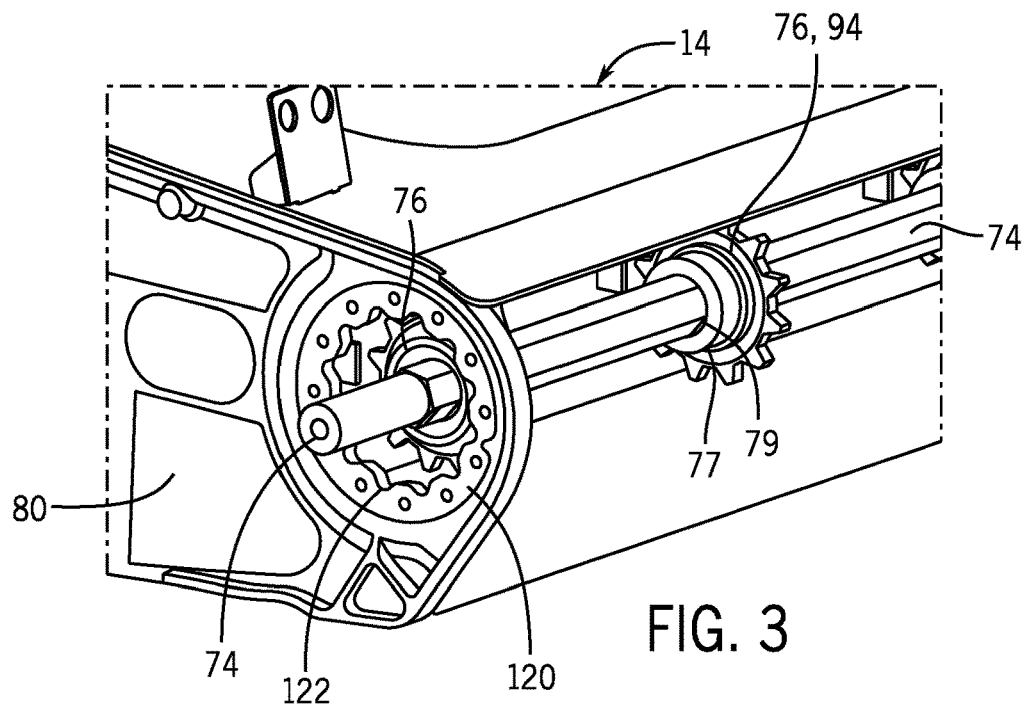
FIG. 3 is an isometric view of a portion of the feeder of FIG. 2, with several components omitted to reveal other internal components of the feeder.

As shown in FIGS. 2 and 3, the sprocket 76 includes an annular main sprocket body 94 with multiple radially extending teeth 88 connected to the circumference of the sprocket body 94 and a sprocket hub 77 extending transversely from one or both side faces of the sprocket body. The sprocket body 94 and sprocket hub 77 have a bore 79 formed therethrough that passes over the shaft 74. The bore 79 is shaped to engage the shaft 74 in a non-rotatable manner so rotation of the shaft 74 also causes rotation of the sprocket 76, or vice versa.

The teeth 88 of the sprocket 76 are uniformly spaced apart about the circumference of the sprocket body 94 so each tooth 88 engages one link 92 of the chain 72 during rotation of the sprocket 76, with the number and placement of teeth 88 on the sprocket 76 being chosen to engage each link 92 of the chain 72 as the sprocket 76 rotates and the links 92 rotate about the sprocket 76. Engaging each link 92 of the chain 72 with a tooth 88 of the sprocket 76 as the sprocket 76 and chain 72 rotate allows for smooth operation of the chain 72 and any conveying elements that might be connected to the chain 72, such as slats or paddles.

Figure 4:
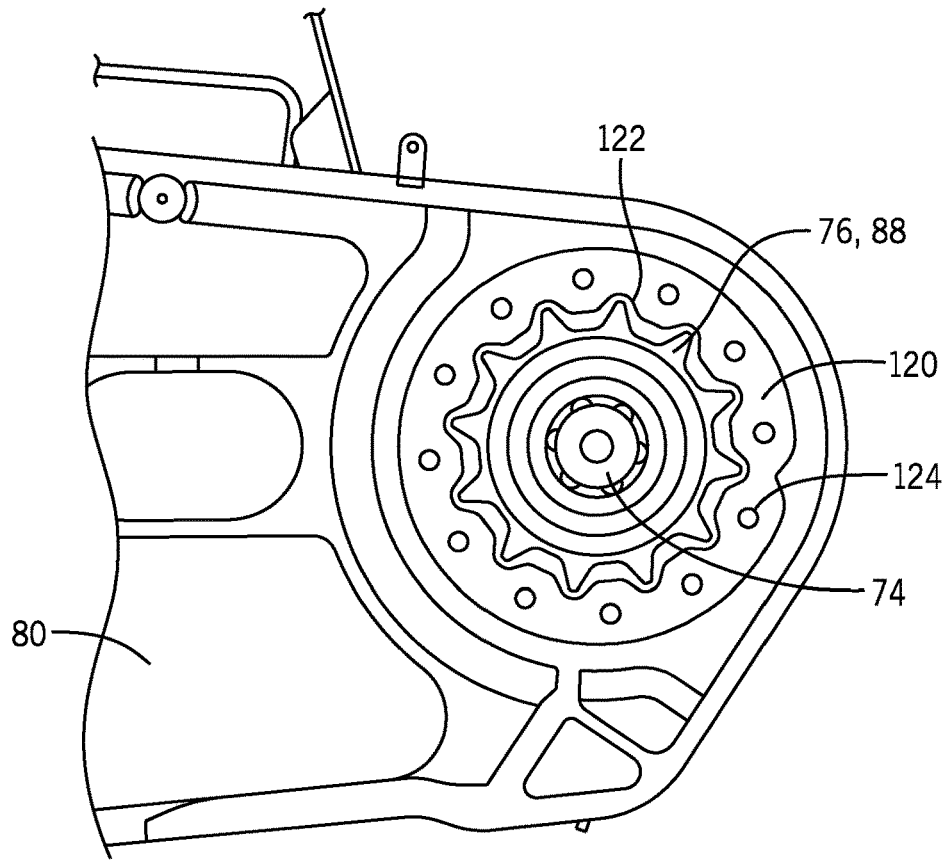
FIG. 4 is a side elevation view of the portion of the feeder shown in FIG. 3.

FIGS. 3 and 4 also depict a partial assembly of the feeder 14. For example, bearing 82, gear 84, chains 72 and various covers have been omitted. A panel 120 is fixedly mounted to (or formed on) the side wall of frame 80. As can be appreciated by viewing FIG. 2, a similar panel 120 is mounted to the opposing side wall of frame 80. Although only one panel 120 and bearing 82, which is mounted thereto, will be described hereinafter, it should be understood that the description also applies to the other panel 120 and bearing 82. However, it is noted that the other panel 120 does not necessarily have to include the opening 122 described hereinafter.

The panel 120 includes a scalloped-circle shaped opening 122 defining a central axis and holes 124 that are uniformly spaced apart in a circumferential direction about the axis. Holes 124 are positioned radially outside of a circle representing a maximum diameter of the scalloped-circle shaped opening 122. Each hole 124 is positioned in radial alignment with one of the scallops of opening 122. Holes 124 may or may not be threaded.

Bearing 82 is mounted to panel 120 by fasteners 126 (FIG. 2) that engage with holes 124. Panel 120 may alternatively either represent or form a wall of the bearing 82. Shaft 74 is positioned through an opening formed in bearing 82 such that bearing(s) 82 mount shaft 74 to frame 80, while shaft 74 can also rotate relative to frame 80.

The scalloped-circle shaped opening 122 is generally, circular, wherein the edge of the circle follows an undulating or sinusoidal shaped trajectory. Stated different, the circle shaped opening 122 has a series of reliefs disposed about its circumference. The reliefs are sized such that the sprockets 76 and their gear teeth 88 can easily pass through the opening 122 without contacting the opening 122. Generally speaking, a perimeter of the opening 122 corresponds in shape to that of the sprockets 76. It should be understood that in an assembled form of feeder 14, the gear teeth 88 do not engage the reliefs of the opening 122. The shape and size of the reliefs of the opening 122 can vary.

According to one exemplary method of partially assembling feeder 14, the sprockets 76 are first fixed in position on shaft 74. The assembled shaft 74 is then moved in the transverse direction through one of the openings 122 (such as the opening shown in FIG. 3) until the central portion of the assembled shaft 74 is positioned within the interior region of frame 80. Each bearing 82 is then mounted to one end of shaft 74 as well as panel 120.

Further details of combine 10 are described in U.S. Pat. No. 7,090,070 to CNH America LLC, which is incorporated by reference herein in its entirety. And, further details of feeder 14 are described in U.S. Pat. No. 10,390,485 to CNH America LLC, which is also incorporated by reference herein in its entirety.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A feederhouse for an agricultural vehicle, said feederhouse comprising:
   a frame comprising opposing side walls;
   an assembled driveshaft comprising a shaft and a plurality of sprockets that are rotationally fixed to the shaft, wherein the assembled driveshaft including the plurality of sprockets is positioned within an interior region of the frame;
   one of the side walls of the frame includes a frame opening and frame holes surrounding the frame opening, wherein the frame opening is sized such that the assembled driveshaft including the plurality of sprockets passes in a transverse direction through the frame opening, wherein a perimeter of the frame opening follows an undulating or sinusoidal shaped trajectory, wherein each frame hole is circumferentially positioned between adjacent undulations of the undulating or sinusoidal shaped trajectory;

a bearing including a bearing opening through which the shaft passes and a plurality of bearing holes surrounding the bearing opening, wherein the bearing opening registers with the frame opening; and fasteners that are each respectively mounted to one of the bearing holes and one of the frame holes for securing the bearing to the frame.

2. The feederhouse of claim 1, wherein the frame opening is a scalloped-circle shaped opening.

3. The feederhouse of claim 1, wherein the frame opening is formed in the frame or another part that is mounted to the frame.

4. The feederhouse of claim 1, wherein the perimeter of the frame opening corresponds in shape to that of the sprockets.

5. The feederhouse of claim 1, wherein each sprocket includes a body and gear teeth extending from the body.

6. The feederhouse of claim 1, wherein the shaft has an elongated body that extends along a shaft axis, and the frame opening has a central axis that is substantially parallel to the shaft axis.

7. A combine harvester comprising the feederhouse of claim 1.

8. The feederhouse of claim 1, wherein each undulation of the adjacent undulations constitutes a crest of the undulating or sinusoidal shaped trajectory, and a trough extends between each of the adjacent undulations.

9. The feederhouse of claim 8, wherein each of the frame holes is radially aligned with a respective trough of the undulating or sinusoidal shaped trajectory.

\* \* \* \* \*